(12) United States Patent
Cui et al.

(10) Patent No.: US 11,171,719 B2
(45) Date of Patent: Nov. 9, 2021

(54) FACILITATING DYNAMIC SATELLITE AND MOBILITY CONVERGENCE FOR MOBILITY BACKHAUL IN ADVANCED NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Paul Smith, Jr., Heath, TX (US); Sangar Dowlatkhah, Plano, TX (US)

(73) Assignees: AT&T Intellectual Property 1, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/396,385

(22) Filed: Apr. 26, 2019

(65) Prior Publication Data
US 2020/0343969 A1    Oct. 29, 2020

(51) Int. Cl.
*H04B 7/185* (2006.01)
*H04W 40/02* (2009.01)
(Continued)

(52) U.S. Cl.
CPC ..... *H04B 7/18584* (2013.01); *H04B 7/18519* (2013.01); *H04B 7/18563* (2013.01);
(Continued)

(58) Field of Classification Search
CPC ............ H04B 7/18584; H04B 7/18519; H04B 7/18563; H04B 7/18591; H04W 40/023;
(Continued)

(56) References Cited

U.S. PATENT DOCUMENTS 954,893 A    4/1910  Simpson
5,327,572 A  7/1994  Freeburg
(Continued)

FOREIGN PATENT DOCUMENTS

EP    3 062 451 B1   6/2018
GB    2 575 034 A    1/2020
(Continued)

OTHER PUBLICATIONS

X. Artiga, J. Nunez-Martinez, A. Perez-Neira, G. J. L. Vela, J. M. F. Garcia and G. Ziaragkas, "Terrestrial-satellite integration in dynamic 5G backhaul networks," 2016 8th Advanced Satellite Multimedia Systems Conference and the 14th Signal Processing for Space Communications Workshop. (Year: 2016).*

(Continued)

*Primary Examiner* — Jae Y Lee
*Assistant Examiner* — Mohammed M Murshid
(74) *Attorney, Agent, or Firm* — Amin, Turocy & Watson, LLP

(57) ABSTRACT

Facilitating dynamic satellite and mobility convergence for mobility backhaul in advanced networks (e.g., 4G, 5G, 6G and beyond) is provided herein. Operations of a system can comprise determining that a group of user equipment devices are located in a defined geographic area and are consuming more than a defined level of resources of a wireless communications network based on an amount of network traffic received from the group of user equipment devices. The operations also can comprise configuring an integrated network comprising a first group of terrestrial network devices and a second group of satellite network devices. Further, the operations can comprise routing at least a portion of network traffic associated with the group of user equipment devices among the first group of terrestrial net- (Continued)

work devices and the second group of satellite network devices.

20 Claims, 11 Drawing Sheets

(51) Int. Cl.
 *H04W 28/02* (2009.01)
 *H04L 12/24* (2006.01)
(52) U.S. Cl.
 CPC ..... *H04B 7/18591* (2013.01); *H04L 41/5022* (2013.01); *H04W 28/0247* (2013.01); *H04W 28/0268* (2013.01); *H04W 28/0289* (2013.01); *H04W 40/023* (2013.01)
(58) Field of Classification Search
 CPC ......... H04W 28/0289; H04W 28/0247; H04W 28/0268; H04W 40/02; H04L 41/5025; H04L 43/0882; H04L 41/12; H04L 41/0893; H04L 41/5022; H04L 45/24
 See application file for complete search history.

(56) References Cited

U.S. PATENT DOCUMENTS

| | | | |
|---|---|---|---|
| 5,572,530 A | 11/1996 | Chitre et al. | |
| 6,157,834 A | 12/2000 | Helm et al. | |
| 6,272,315 B1 | 8/2001 | Chang et al. | |
| 6,614,769 B1 | 9/2003 | Erlick et al. | |
| 6,634,027 B1 | 10/2003 | Johnson | |
| 6,726,152 B2 | 4/2004 | Higgins | |
| 7,065,321 B2 | 6/2006 | Lim | |
| 7,174,127 B2 | 2/2007 | Otten et al. | |
| 7,403,470 B2 | 7/2008 | Lane et al. | |
| 7,646,752 B1 | 1/2010 | Periyalwar et al. | |
| 8,190,084 B1 | 5/2012 | Gunasekara | |
| 8,787,237 B2 | 7/2014 | Väre et al. | |
| 8,787,903 B2 | 7/2014 | Boustie et al. | |
| 8,804,502 B2 | 8/2014 | Henry et al. | |
| 8,811,366 B2 | 8/2014 | Ashrafi | |
| 8,923,849 B2 | 12/2014 | Monte et al. | |
| 9,014,083 B2 | 4/2015 | Boltz et al. | |
| 9,369,883 B2 | 6/2016 | Giffin et al. | |
| 9,866,313 B1 | 1/2018 | Murphy | |
| 9,906,989 B2 | 2/2018 | Buckle et al. | |
| 9,948,380 B1 | 4/2018 | Vos et al. | |
| 9,998,900 B1 | 6/2018 | Yoo | |
| 10,045,326 B2 | 8/2018 | Blanchard et al. | |
| 10,243,791 B2* | 3/2019 | Dosovitsky | H04L 43/08 |
| 2005/0153732 A1 | 7/2005 | Stotelmyer et al. | |
| 2005/0288012 A1 | 12/2005 | Morgan | |
| 2006/0050736 A1 | 3/2006 | Segel | |
| 2007/0083650 A1* | 4/2007 | Collomb | G06Q 10/04 709/224 |
| 2007/0123252 A1 | 5/2007 | Tronc et al. | |
| 2008/0261512 A1 | 10/2008 | Milbrandt et al. | |
| 2009/0154395 A1 | 6/2009 | Park et al. | |
| 2010/0048205 A1 | 2/2010 | Guilford et al. | |
| 2011/0136428 A1 | 6/2011 | Ritter | |
| 2012/0100801 A1 | 4/2012 | Yuan et al. | |
| 2012/0166622 A1* | 6/2012 | Draznin | H04W 48/18 709/224 |
| 2013/0039275 A1* | 2/2013 | Patil | H04W 36/36 370/328 |
| 2013/0070664 A1* | 3/2013 | Nagata | H04W 72/0453 370/315 |
| 2014/0213256 A1* | 7/2014 | Meylan | H04W 48/18 455/436 |
| 2014/0355476 A1* | 12/2014 | Anderson | H04W 24/02 370/254 |
| 2015/0085650 A1 | 3/2015 | Cui et al. | |
| 2015/0201460 A1 | 7/2015 | Flynn | |
| 2015/0358959 A1 | 12/2015 | Meshkati et al. | |
| 2016/0006500 A1 | 1/2016 | Radpour | |
| 2016/0037422 A1 | 2/2016 | Rost et al. | |
| 2016/0173382 A1* | 6/2016 | Korosi | H04L 47/125 370/235 |
| 2016/0381693 A1* | 12/2016 | Sanda | H04L 47/2433 370/329 |
| 2017/0055175 A1 | 2/2017 | Leroux et al. | |
| 2017/0063645 A1* | 3/2017 | Testa | H04L 41/5035 |
| 2017/0294957 A1 | 10/2017 | Ravishankar et al. | |
| 2018/0123932 A1 | 5/2018 | Shaw et al. | |
| 2018/0176143 A1 | 6/2018 | Cui et al. | |
| 2018/0199207 A1 | 7/2018 | Zavesky et al. | |
| 2018/0205449 A1 | 7/2018 | Durvasula et al. | |
| 2018/0205639 A1 | 7/2018 | Zakaria et al. | |
| 2018/0242189 A1 | 8/2018 | Wang et al. | |
| 2019/0045421 A1* | 2/2019 | Shah | H04W 40/02 |
| 2019/0150080 A1 | 5/2019 | Davies et al. | |

FOREIGN PATENT DOCUMENTS

| | | |
|---|---|---|
| WO | 2017/220110 A1 | 12/2017 |
| WO | 2018/065764 A1 | 4/2018 |

OTHER PUBLICATIONS

Courville et al., "Hybrid satellite/terrestrial networks: State of the art and future perspectives", QShine Workshop: Satellite/Terrestrial Interworking, ACM, 2007, 8 pages.

Evans et al., "Integration of Satellite and Terrestrial Systems in Future Multimedia Communications", IEEE Wireless Communications, Oct. 2005, pp. 72-80.

Taleb et al., "Challenges, Opportunities, and Solutions for Converged Satellite and Terrestrial Networks", IEEE Wireless Communications, Feb. 2011, pp. 46-52.

Evans et al., "The Role of Satellites in 5G", 7th Advanced Satellite Multimedia Systems Conference and the 13th Signal Processing for Space Communications Workshop (ASMS/SPSC), IEEE, 2014, pp. 197-202.

Grazia et al., "Integration between Terrestrial and Satellite Networks: the PPDR-TC vision", The IEEE WiMob Workshop on Emergency Networks for Public Protection and Disaster Relief, 2014, pp. 77-84.

Artiga et al., "Terrestrial-Satellite Integration in Dynamic 5G Backhaul Networks", 8th Advanced Satellite Multimedia Systems Conference and the 14th Signal Processing for Space Communications Workshop (ASMS/SPSC), IEEE, 2016, 6 pages.

Watts et al., "5G Resilient Backhaul using Integrated Satellite Networks", 7th Advanced Satellite Multimedia Systems Conference and the 13th Signal Processing for Space Communications Workshop (ASMS/SPSC), IEEE, 2014, pp. 114-119.

Lagunas et al., "Carrier Allocation for Hybrid Satellite-Terrestrial Backhaul Networks", Communications Workshops (ICC Workshops), IEEE International Conference, IEEE, 2017, 6 pages.

Estrem et al., "Portable Satellite Backhauling Solution for Emergency Communications", 5th Advanced Satellite Multimedia Systems Conference and the 11th Signal Processing for Space Communications Workshop, IEEE, 2010, pp. 262-269.

Non-Final Office Action received for U.S. Appl. No. 16/218,090 dated Dec. 2, 2020, 61 pages.

Non Final Office Action received for U.S. Appl. No. 16/396,385 dated Apr. 15, 2021, 35 pages. dated Jul. 15, 2020.

Non Final Office Action received for U.S. Appl. No. 16/218,090 dated Sep. 28, 2021, 38 pages.

* cited by examiner

FACILITATING DYNAMIC SATELLITE AND MOBILITY CONVERGENCE FOR MOBILITY BACKHAUL IN ADVANCED NETWORKS

TECHNICAL FIELD

This disclosure relates generally to the field of mobile communication and, more specifically, to facilitating dynamic satellite and mobility convergence for mobility backhaul in advanced networks (e.g., 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
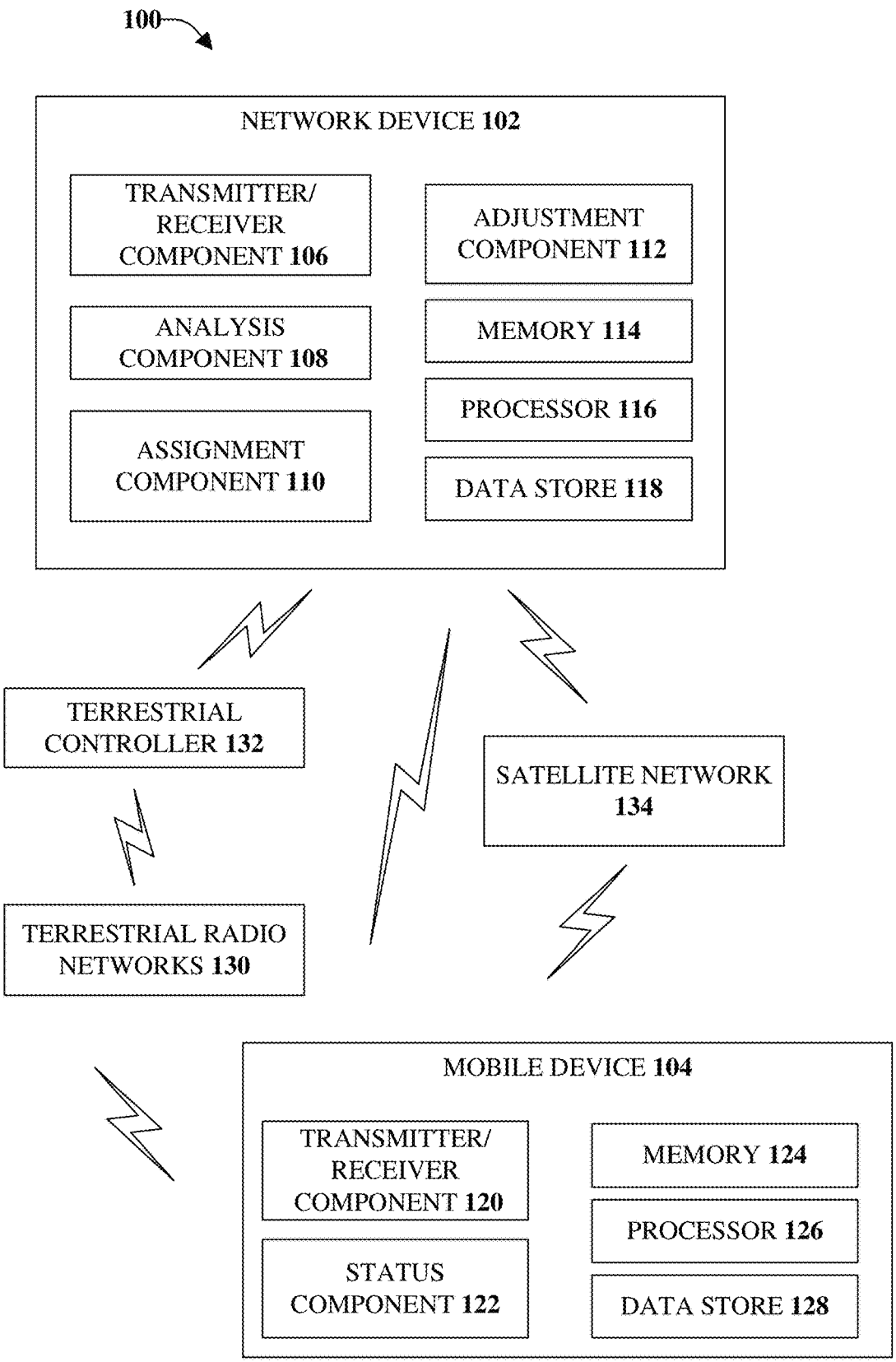
FIG. 1 illustrates an example, non-limiting, system for dynamic satellite and mobility convergence for mobility backhaul in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate dynamic satellite and mobility convergence for mobility backhaul in advanced networks. To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 6G network can be configured to provide more bandwidth than the bandwidth available in other networks (e.g., 4G network, 5G network). A 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth used for a high-definition video stream, Internet of Everything (IoE) devices, and others.

Ubiquitous as the number of access technologies working together to create universal coverage and always-on broadband global network is a factor in 6G. It is expected that more integrated terrestrial wireless with satellite systems (with using specially designed nano-antennas) in the access network can be facilitated with the disclosed aspects.

In addition, a 6G Ubiquitous Access Network can integrate a number of access technologies together to create universal coverage and always-on broadband global network to provide greater access bandwidth. On the backhaul side, even though fiber technologies can allow fast speeds (e.g., 10 Gigabits per second (Gbps) or higher), installing fiber for backhaul to some or all of the NBs can be very expensive (e.g., a high capital expense), demanding, and can be a challenge to the network operators.

Further, air interface technologies such as mmW and WiGig provide very high bandwidth (e.g., N Gbps). The current backhaul bandwidth is falling behind. Even though fiber technology allows 10 Gbps or higher data rate, installing fiber backhaul is very capital expenditure demanding and can be a challenge to the operators.

The various aspects discussed herein addresses the 6G network backhaul. Satellite is proposed to provide additional backhaul bandwidth when adding fiber bandwidth is challenging or/or economically prohibitive.

According to an embodiment, provided is a system that can comprise a processor and a memory that stores executable instructions that, when executed by the processor, facilitate performance of operations. The operations can comprise determining that a group of user equipment devices are located in a defined geographic area and are consuming more than a defined level of resources of a wireless communications network based on an amount of network traffic received from the group of user equipment devices. The operations also can comprise configuring an integrated network comprising a first group of terrestrial network devices and a second group of satellite network devices. Further, the operations can comprise routing at least a portion of network traffic associated with the group of user equipment devices among the first group of terrestrial network devices and the second group of satellite network devices. For example, the integrated network can be adapted to operate according to a sixth generation wireless telecommunication protocol.

According to some implementations, routing at least the portion of the network traffic can comprise routing a first group of network traffic via the first group of terrestrial network devices and routing a second group of network traffic via the second group of satellite network devices. Further to these implementations, the operations can comprise determining respective applications executing on user equipment devices of the group of user equipment devices. Further, the operations can comprise allocating at least the portion of the network traffic of the user equipment devices to the first group of the network traffic or the second group of the network traffic based on the respective applications executing on the user equipment devices. Additionally, the operations can comprise evaluating a service level agreement associated with the respective applications executing on the user equipment devices and allocating the user equipment devices based on the service level agreement and the respective applications executing on the user equipment devices.

In an example, the first group of the network traffic and the second group of the network traffic can be disproportionately split between the first group of terrestrial network devices and the second group of satellite network devices.

The operations can comprise, according to some implementations, controlling a capacity of a radio access based on a convergence of the second group of satellite network devices with the first group of terrestrial network devices.

Further, in some implementations, the operations can comprise, prior to determining that the group of user equipment devices are located in the defined geographic area, receiving, from the terrestrial network device, information indicative of respective backhaul link bandwidth and respective resource utilization.

According to some implementations, the operations can comprise, prior to determining that the group of user equipment devices are located in the defined geographic area, determining information related to a planned event. Further to these implementations, the operations can comprise increasing a backhaul bandwidth to the defined geographic area prior to a commencement of the planned event.

The operations can comprise, according to some implementations, scheduling a satellite network device of the second group of satellite network devices to forward at least the portion of the network traffic to a transmission point in the wireless communications network.

Further, according to some implementations, the operations can comprise receiving, from user equipment devices of the group of user equipment devices, respective information related to received buffered packets. In addition, the operations can comprise adjusting a route for at least the portion of the network traffic associated with the group of user equipment devices between the first group of terrestrial network devices and the second group of satellite network devices based on the respective information related to the received buffered packets.

Another embodiment can relate to a method that can comprise receiving, by a device comprising a processor, first information associated with a first condition of a terrestrial radio network of a group of terrestrial radio networks from a terrestrial controller that collects the first information from the group of terrestrial radio networks. The method also can comprise determining, by the device, second information associated with a resource of a satellite network. The satellite network can be integrated with the group of terrestrial radio networks to form an integrated network to which a group of mobile devices in a defined geographic area connect. Further, respective applications can be executable at mobile devices of the group of mobile devices via the satellite network or one terrestrial radio network of the group of terrestrial radio networks. The method also can comprise determining, by the device, whether to re-assign one or more defined applications of the respective applications from the group of terrestrial radio networks to the satellite network based on at least the first condition.

According to some implementations, the first condition can comprise an access load condition of the terrestrial radio network relative to the resource of the satellite network, and can be based on respective subscriptions associated with the group of mobile devices. In some implementations, the first condition can comprise an access load condition of the terrestrial radio network relative to the resource of the satellite network and an acceptable service level of the respective applications.

The method can comprise, according to some implementations, receiving, by the device from the mobile devices, respective information related to received buffered packets. Further, the method can comprise modifying, by the device, a routing of at least a portion of network traffic associated with the group of mobile devices between the terrestrial radio network and the satellite network based on the respective information related to the received buffered packets.

In an example, a defined application can be alternatively executable at the mobile devices via a selection, by the device, between the satellite network and the group of terrestrial radio networks. Further, in some implementations, the integrated network can be adapted to operate according to a sixth generation wireless telecommunication protocol.

Another embodiment can relate to a machine-readable storage medium, comprising executable instructions that, when executed by a processor, facilitate performance of operations. The operations can comprise obtaining first information associated with a first condition of a terrestrial radio network of a group of terrestrial radio networks and obtaining second information associated with a service level agreement associated with a defined application executing on a user equipment device. The operations also can comprise integrating a satellite network with the group of terrestrial radio networks to form an integrated network to which the user equipment device connects. Further, the operations can comprise determining an assignment of the defined application between the terrestrial radio network and the satellite network based on at least the first information and the second information.

In an example, the first condition can comprise an access load condition of the terrestrial radio network relative to a resource of the satellite network, and can be based on at least a subscription of an entity associated with the user equipment device. In another example, the first condition can comprise an access load condition of the terrestrial radio network relative to a resource of the satellite network and an acceptable service level of the defined application.

Referring initially to FIG. 1, illustrated is an example, non-limiting, system 100 for dynamic satellite and mobility convergence for mobility backhaul in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a network device 102 and a mobile device 104. The network device 102 can be included in a group of network devices of a wireless network. Although only a single mobile device and a single network device are shown and described, the various aspects are not limited to this implementation. Instead, multiple mobile devices and/or multiple network devices can be included in a communications system.

The network device 102 can comprise a transmitter/receiver component 106, an analysis component 108, an assignment component 110, an adjustment component 112, at least one memory 114, at least one processor 116, and at least one data store 118. The mobile device 104 can include a transmitter/receiver component 120, a status component 122, at least one memory 124, at least one processor 126, and at least one data store 128.

The transmitter/receiver component 106 can receive first information associated with a first condition of a terrestrial radio network of a group of terrestrial radio networks 130. For example, the first information can be received from a terrestrial controller 132 that can collect the first information from the group of terrestrial radio networks 130.

The terrestrial controller 132 can comprise at least one memory, at least one processor, a transmitter/receiver component, as well as other components (not illustrated for purposes of simplicity). The terrestrial controller 132 can be an access device that can facilitate access to one or more different networks (e.g., terrestrial networks and satellite networks). For example, the access device can comprise terrestrial controllers (e.g., macro cell base station devices, millimeter wave base station devices, femto cell access devices, Wi-Fi access point devices, and the like) that provide access to a terrestrial network (e.g., macro cell, micro cell, femto cell, etc.). Further, the terms "femto" and "femto cell" are used interchangeably, the terms "macro" and "macro cell" are used interchangeably and the terms "micro" and "micro cell" are used interchangeably.

As used herein, the term "terrestrial" means Earth-based. Thus, a terrestrial network can be any network that transmits and/or receives signals from Earth. By contrast, a satellite network can be a network that transmits and/or receives signals via satellite communication. Similarly, a terrestrial controller is a device that controls one or more aspects of communication, resource allocation or the like for a terrestrial network while a satellite controller is a device that controls one or more aspects of communication, resource allocation or the like for satellite communication. A satellite controller can be or include a satellite communication system in some embodiments.

Based on the first information, the analysis component 108 can determine second information associated with a resource of a satellite network 134. According to some implementations, the satellite network 134 can be integrated with the group of terrestrial radio networks 130 to form an integrated network. A group of mobile devices, including the mobile device 104, can be in a defined geographic area and can connect to the integrated network. For example, the connection can communicatively couple the group of mobile devices and the integrated network. For example, the integrated network can be adapted to operate according to a sixth generation wireless telecommunication protocol.

Further, respective applications can be executable at mobile devices of the group of mobile devices. For example, the respective applications can be executable via the satellite network 134 or one terrestrial radio network of the group of terrestrial radio networks 130. In an example, the status component 122 can provide information related to an application that is executing on the mobile device 104, or which is capable of executing on (and expected to execute on) the mobile device 104. For example, the information can be conveyed via the transmitter/receiver component 120.

According to some implementations, the first condition can comprise an access load condition of the terrestrial radio network of the terrestrial radio networks 130 relative to the resource of the satellite network 134. For example, the first condition can be based on respective subscriptions associated with the group of mobile devices. In accordance with some implementations, the first condition can comprise an access load condition of the terrestrial radio networks 130 relative to the resource of the satellite network 134. In addiction the first condition can comprise an acceptable service level of the respective applications.

In various examples, the first condition can comprise can policy information or rules for handling or provisioning of different applications or services, service level agreement information for one or more entities associated with a mobile device, quality of experience information or subscription information from an entity associated with a mobile device, status of a buffer of a mobile device, status of one or more resources (e.g., access load, backhaul load, bandwidth) for one or more terrestrial networks, assigned resources for one or more mobile devices, terrestrial networks and the like.

The assignment component 110 can determine whether to re-assign one or more defined applications of the respective applications from the group of terrestrial radio networks 130 to the satellite network 134. For example, a defined application can be alternatively executable at the mobile device 104 via a selection, by the network device 102, between the satellite network 134 and the group of terrestrial radio networks 130. According to some implementations, the determination by the assignment component 110 can be based on at least the first condition of the terrestrial radio network.

Further, the transmitter/receiver component 106 can receive from the mobile device 104 information related to received buffered packets. The adjustment component 112 can modify a routing of network traffic associated with the group of mobile devices between the terrestrial radio network and the satellite network based on the respective information related to the received buffered packets. For example, at least a portion of the network traffic can be routed, or all network traffic can be routed, between the terrestrial radio network and the satellite network. Further, the network traffic can be network traffic to the group of mobile devices and/or network traffic from the group of mobile devices.

In an example, the analysis component 108 can determine that a group of mobile devices (e.g., including the mobile device 104) are located in a defined geographic area and are consuming more than a defined level of resources of a wireless communications network (e.g., the terrestrial radio networks 130). The determination by the analysis component 108 can be based on an amount of network traffic received from the group of user equipment devices.

Based on the determination by the analysis component 108, the assignment component 110 can configure an integrated network. The integrated network can include at least a first group of terrestrial network devices of the terrestrial radio networks 130 and a second group of satellite network devices (e.g., the satellite network 134). The network traffic (or at least a portion of network traffic) to and/or from the group of mobile devices can be routed among the first group of terrestrial network devices and the second group of satellite network devices.

In an example, to configure the integrated network, the assignment component 110 can route a first group of the network traffic via the first group of terrestrial network devices. Further, a second group of the network traffic can be routed via the second group of satellite network devices. To determine how to route the network traffic, the assignment component 110 can determine respective applications executing on user equipment devices of the group of user equipment devices. The first group of network traffic and the second group of network traffic can be split equally, or unequally, between the first group of terrestrial network devices and the second group of satellite network devices.

The assignment component 110 can allocate the network traffic of the user equipment devices to the first group of the network traffic or the second group of the network traffic based on the respective applications executing on the user equipment devices. In an example, a service level agreement associated with the respective applications executing on the user equipment devices can be evaluated and the user equipment devices can be allocated based on the service level agreement and the respective applications executing on the user equipment devices.

According to an implementation, a capacity of a radio access can be controlled based on a convergence of the second group of satellite network devices with the first group of terrestrial network devices.

In some implementations, prior to determining that the group of user equipment devices are located in the defined geographic area, the transmitter/receiver component 106 can receive, from a terrestrial network device (e.g., the terrestrial controller 132), information indicative of respective backhaul link bandwidths and respective resource utilizations. In some implementations, prior to determining that the group of user equipment devices are located in the defined geographic area, the analysis component 108 can determine information related to a planned event. Further, the assignment component 110 can increase a backhaul bandwidth to the defined geographic area prior to a commencement of the planned event.

In an example, the network device 102 can schedule a satellite network device of the second group of satellite network devices to forward the network traffic to a transmission point in the wireless communications network.

According to some implementations, the transmitter/receiver component 106 can receive from user equipment devices of the group of user equipment devices, respective information related to received buffered packets. Further, the adjustment component 112 can adjust a route for at least a subset of the network traffic associated with the group of user equipment devices between the first group of terrestrial network devices and the second group of satellite network devices based on the respective information related to the received buffered packets. The network traffic associated with the group of user equipment devices can be network traffic transmitted from the group of user equipment devices and/or network traffic transmitted to the group of user equipment devices.

The transmitter/receiver component 106 can be configured to transmit to, and/or receive data from, the mobile device 104, other network devices, and/or other mobile devices. Through the transmitter/receiver component 106, the network device 102 can concurrently transmit and receive data, can transmit and receive data at different times, or combinations thereof. Further, the transmitter/receiver component 120 can be configured to transmit to, and/or receive data from, the network device 102, other mobile devices, and/or other network devices. Through the transmitter/receiver component 120, the mobile device 104 can concurrently transmit and receive data, can transmit and receive data at different times, or combinations thereof.

The at least one memory 114 can be operatively connected to the at least one processor 116. The at least one memory 114 can store executable instructions that, when executed by the at least one processor 116 can facilitate performance of operations. Further, the at least one processor 116 can be utilized to execute computer executable components stored in the at least one memory 114.

For example, the at least one memory 114 can store protocols associated with facilitating dynamic satellite and mobility convergence for mobility backhaul in advanced networks as discussed herein. Further, the at least one memory 114 can facilitate action to control communication between the network device 102, the mobile device 104, other mobile devices, and/or other network devices, such that the network device 102 can employ stored protocols and/or algorithms to achieve improved communications in a wireless network as described herein.

Further, the at least one memory 124 can be operatively connected to the at least one processor 126. The at least one memory 124 can store executable instructions that, when executed by the at least one processor 126 can facilitate performance of operations. Further, the at least one processor 126 can be utilized to execute computer executable components stored in the at least one memory 124.

For example, the at least one memory 124 can store protocols associated with facilitating dynamic satellite and mobility convergence for mobility backhaul in advanced networks as discussed herein. Further, the at least one memory 124 can facilitate action to control communication between the mobile device 104, the network device 102, other network devices, and/or other mobile devices, such that the mobile device 104 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to facilitating dynamic satellite and mobility convergence for mobility backhaul in advanced networks. The at least one processor 116 can be a processor dedicated to analyzing and/or generating information received, a processor that controls one or more components of the network device 102, and/or a processor that both analyzes and generates information received and controls one or more components of the network device 102.

In addition, the at least one processor 126 can facilitate respective analysis of information related to facilitating dynamic satellite and mobility convergence for mobility backhaul in advanced networks. The at least one processor 126 can be a processor dedicated to analyzing and/or generating information received, a processor that controls one or more components of the mobile device 104, and/or a processor that both analyzes and generates information received and controls one or more components of the mobile device 104.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 102) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
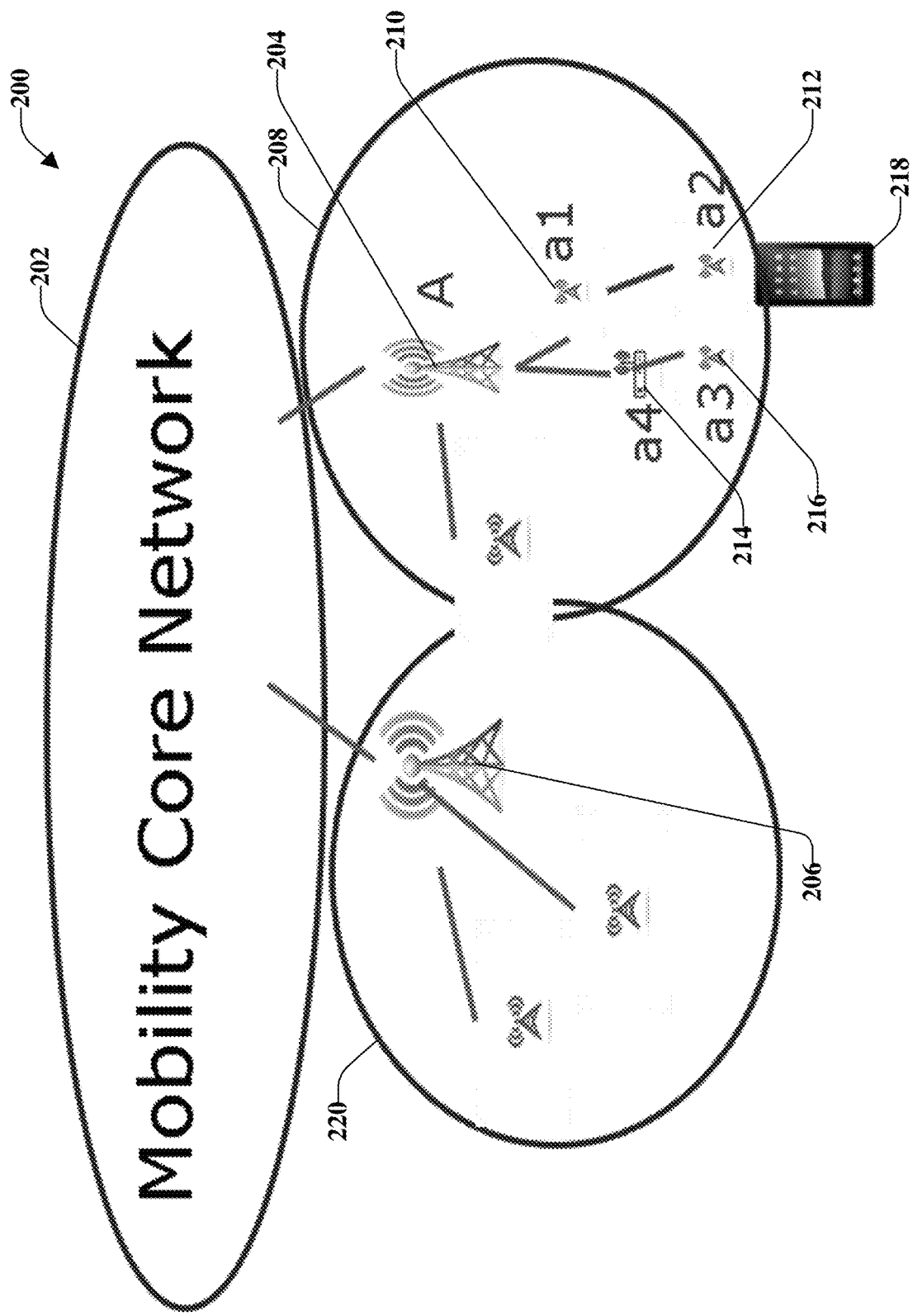
FIG. 2 illustrates an example, non-limiting, representation of a system prior to the detection of an event according to an implementation.

FIG. 2 illustrates an example, non-limiting, representation of a system 200 prior to the detection of an event according to an implementation. As illustrated a mobility core network 202 can be communicatively coupled to a first base station 204 and a second base station 206 such as via respective fiber backhaul links. The radio access technology utilized between the mobility core network 202 and the first base station 204 is denoted as "A."

The first base station 204 can be associated with a first geographic area 208 that can comprise a number of network devices, illustrated as a first network device 210, a second network device 212, a third network device 214, and a fourth network device 216. The radio access technology for the backhaul link between the first base station 204 and the first network device 210 is denoted as "a1." The radio access technology for the backhaul link between the first network device 210 and the second network device 212 is denoted as "a2." Further, the radio access technology for the backhaul link between the first base station 204 and the third network device 214 is denoted as "a4." The radio access technology for the backhaul link between the fourth network device 216 and the third network device 214 is denoted as "a3." One or more network devices in the first geographic area 208 can be communicatively coupled with a UE device 218. The second base station 206 can be associate with a second geographic area 220 that comprises respective network devices (not labeled for purposes of simplicity).

Table 1 below illustrates an example, non-limiting, radio network backhaul conditions prior to the detection of an event.

TABLE 1

| | TRP Backhaul Conditions | | | |
| --- | --- | --- | --- | --- |
| RAT | Backhaul links | TRP backhaul characteristics | Backhaul load | Channel condition |
| A | fiber | 10 Gbps | 60% | poor |
| a1 | wireless a1-> A | IAB 1 Gbps | 80% | good |
| a2 | Wireless a2->a1 | 500 Mbps | 90% | good |
| | Wireless a2 -> a4 | — (not active) | 0% | poor |

TABLE 1-continued

| | TRP Backhaul Conditions | | | |
|---|---|---|---|---|
| RAT | Backhaul links | TRP backhaul characteristics | Backhaul load | Channel condition |
| a3 | wireless a3 –> a4 | 5G IAB | 20% | good |

Figure 3:
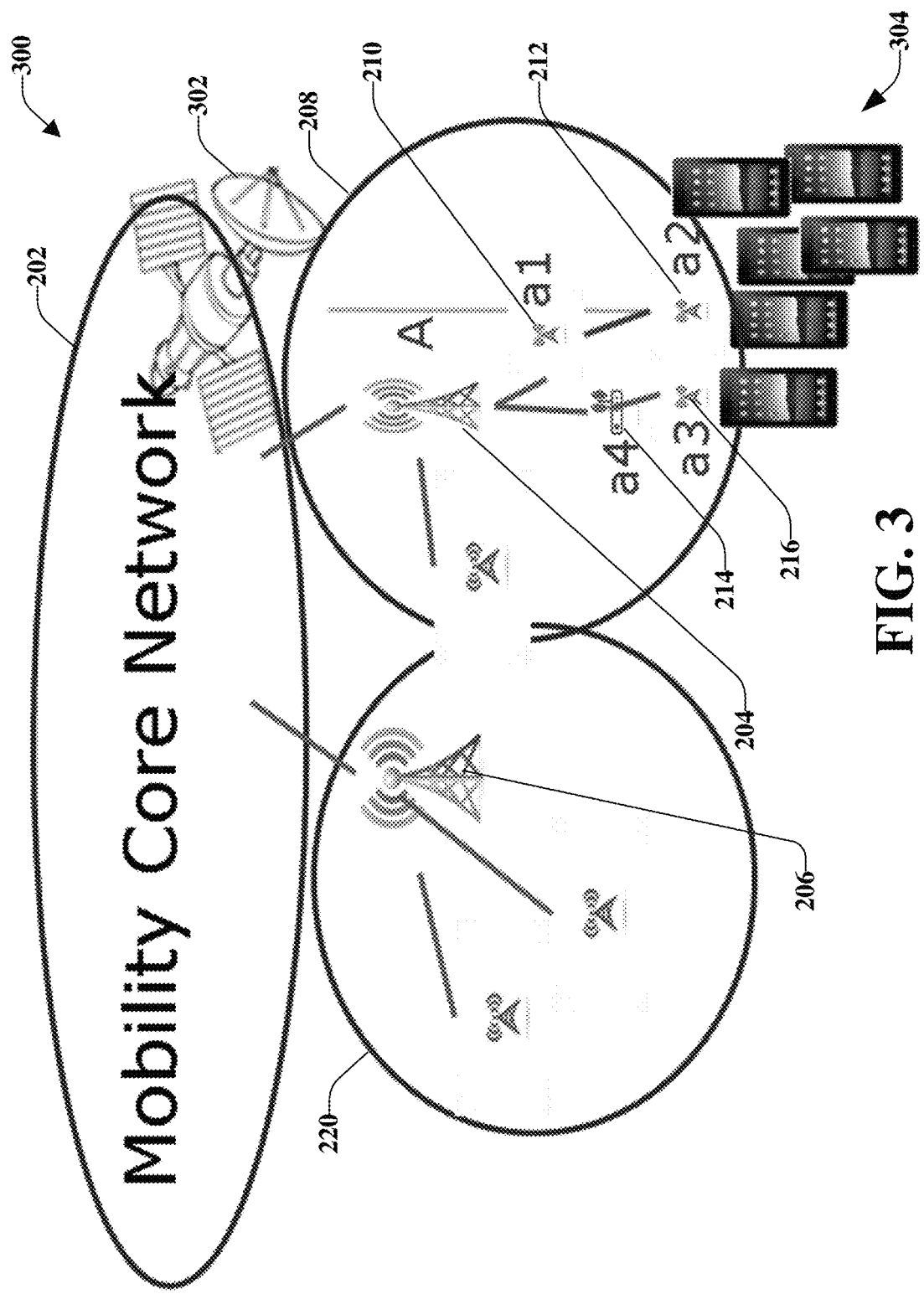
FIG. 3 illustrates an example, non-limiting, representation of a system after to the detection of an event in accordance with one or more embodiments described herein.

As illustrated, when the backhaul load is determined to be large (e.g., approaching ninety percent, as an example), a satellite can be added as discussed herein. FIG. 3 illustrates an example, non-limiting, representation of a system 300 after to the detection of an event in accordance with one or more embodiments described herein. Repetitive description of like elements employed in other embodiments described herein is omitted for sake of brevity.

As illustrated one or more satellites 302 can be added as an additional resource in the mobility core network 202. In addition, since an event is in process, the one or more network devices in the first geographic area 208 can be communicatively coupled with multiple UE devices 304. Table 2 below illustrates an example, non-limiting, radio network backhaul conditions after detection of the event. As illustrated in Table 2, satellite can be added and/or integrated with the radio access technology (denoted as a2).

TABLE 2

| | TRP Backhaul Conditions | | | |
|---|---|---|---|---|
| RAT | Backhaul links | TRP backhaul characteristics | Backhaul load | Channel condition |
| A | fiber | 10 Gbps | 60% | poor |
| a1 | wireless a1 –> A | IAB 1 Gbps | 80% | good |
| a2 | satellite | 5 Gbps | 60% | good |
| | Wireless a2 –> a1 | 500 Mbps | 90% | good |
| | Wireless a2 –> a4 | — (not active) | 0% | poor |
| a3 | wireless a3 –> a4 | 5G IAB | 20% | good |

Figure 4:
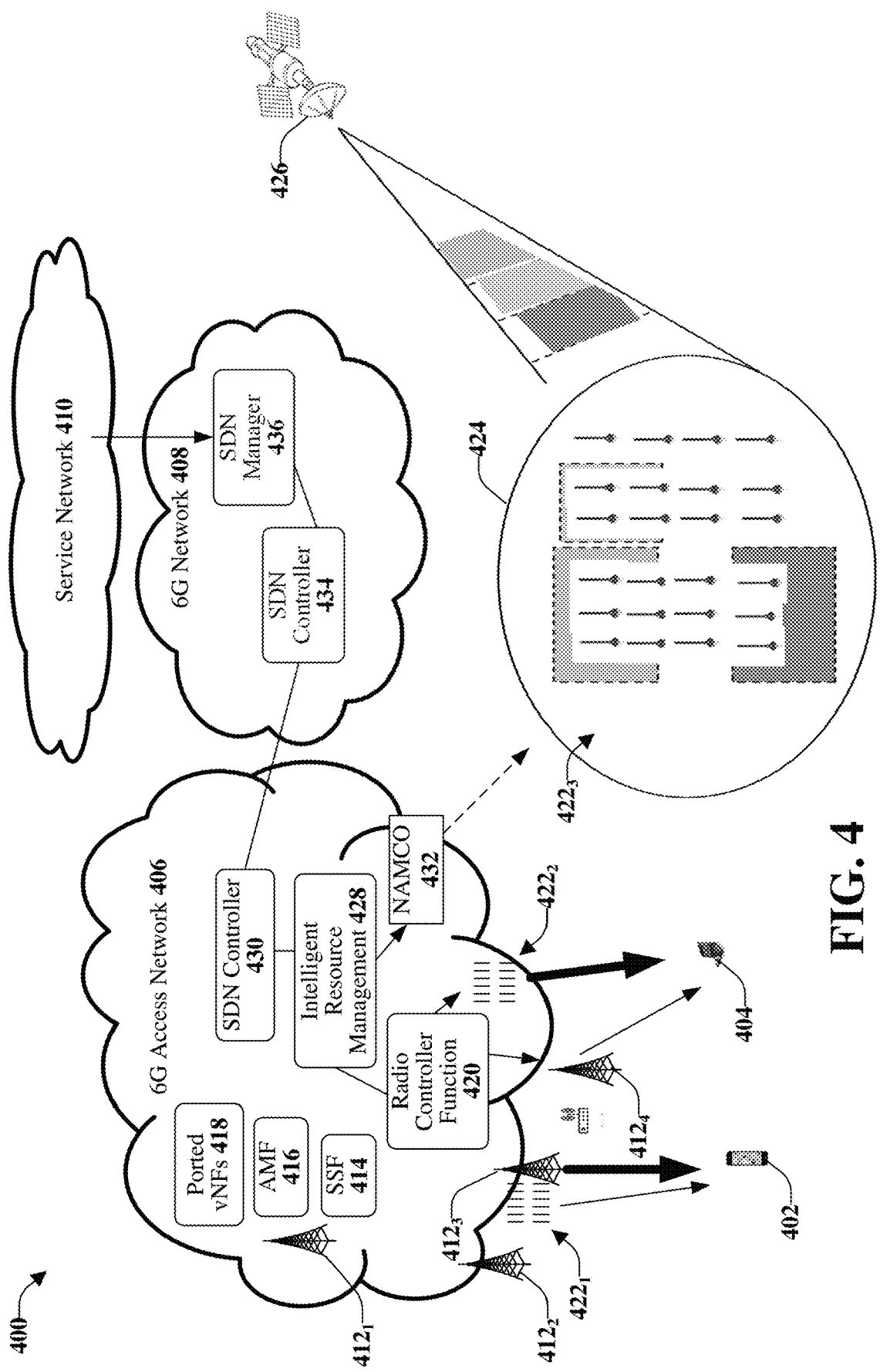
FIG. 4 illustrates an example, non-limiting, system for antenna farm intelligent software defined network enabled dynamic resource controller in advanced networks in accordance with one or more embodiments described herein.

Referring to FIG. 4, illustrated is an example, non-limiting, system 400 for antenna farm intelligent software defined network enabled dynamic resource controller in advanced networks in accordance with one or more embodiments described herein.

As illustrated one or more User Equipment devices (UEs), illustrated as a first UE 402 and a second UE 404, can be communicatively coupled to an access network (e.g., a 6G access network 406). The 6G access network 406 can be communicatively coupled to a 6G network 408 and associated service network 410. The one or more UEs (e.g., the first UE 402 and the second UE 404) can interface with the 6G access network 406 through respective base stations, a few of which are illustrated at base stations $412_1$, $412_2$, $412_3$, and $412_4$.

Included in the 6G access network 406 can be a Services Switching Function (SSF) device 414, an Access Management Function (AMF) device 416, one or more ported network functions virtualization (vNF) devices 418. Also included can be a radio controller function device 420 that can communicate with one or more the base stations and/or one or more antenna farms, illustrated as a first antenna farm $422_1$ and a second antenna farm $422_2$. An exploded view of an antenna farm 424 is illustrated. The antenna farm 424 can communicate with one or more satellites 426 of a satellite network (e.g., the satellite 302).

The radio controller function device 420 can also be communicatively coupled to an Intelligent Resource Management Function Device (IRMF device 428), a Software Defined Networking (SDN controller device 430), and a None Terrestrial Access Management Controller (NAMCO) device (e.g., a NAMCO device 432). Further, the 6G network 408 can comprise a SDN controller device 434 and an SDN manager device 436.

While satellite communication can accrue through a stream of signal from satellite to ground antenna, there can be challenges with signal quality, reception of different bandwidths depending of the amount of data and dynamic of the downstream data as the services demand can change constantly. The various aspects can resolve this challenge, as well as other challenges, with a number of Nano antennas that can be pooled in the access network 406. This can be further communicated to the subscriber (e.g., the first UE 402 and the second UE 404) through the most available access capabilities such as Wi-Fi, 5G NR, and so on. While communication accrues between satellite and other parts of the network, the NAMCO device 432 can communicate with the access management controller function in access slice and coordinate/manage the amount of data streaming through part of Nano antennas for a specific service as illustrated in FIG. 4. The number of Nano antennas chosen for a specific service can change dynamically through the NAMCO device 432, depending on the amount of data as well as signal quality coming from the satellite. Since, the signal quality of satellite can vary depending on weather conditions, the Nano antenna can receive the signal and through compare and contrast can reproduce a clear and suable data stream. The quality of the data stream can vary with number of Nano antennas receiving the signals, QoS can be applied to this equation depending of type of service and service level agreement (SLA) with a subscriber.

While the NAMCO device 432 can communicate with the intelligent resource manager in the 6G access slice, it will not be able to control the number of nano antennas assigned for each stream, or each session. It is the N controller in the network that works with STN manager. The STN manager talks to the service network, so it knows what kind of traffic, the quality of experience, the quality of services earmarked for each stream. It knows the importance and the priorities, is it a premium stream, or it just a streaming video, and so on.

Upon or after that is established, it will talk to the NAMCO and a network can be determined and the number of antennas can be changed. For example, when there is a full NANO antenna sending the same packages and it is determined that the packages are not arriving in the correct order or the right quality, the antennas can be changed from four antennas to six antennas (or a different number of antennas). In another example, if there are a large number of antennas and there is another service being used with these antennas and that is taking priority, the number of antennas can be reduced, and their respective manner of processing can be changed. For example, the reduced number of antennas can be compensated for based on a better use of resources.

Therefore, according to various implementations, the quantity of antennas being used for each service and session can be changed dynamically. Further, how this information is being used or processed can be changed through different codec or different algorithms and, if needed, feedback can be provided. In some implementations, the satellite communication can be used as predominantly a secondary means of communication because of the nature of the resource, so in the resource management section, changes can be made related to what other resources need to be engaged for that specific session.

Figure 5:
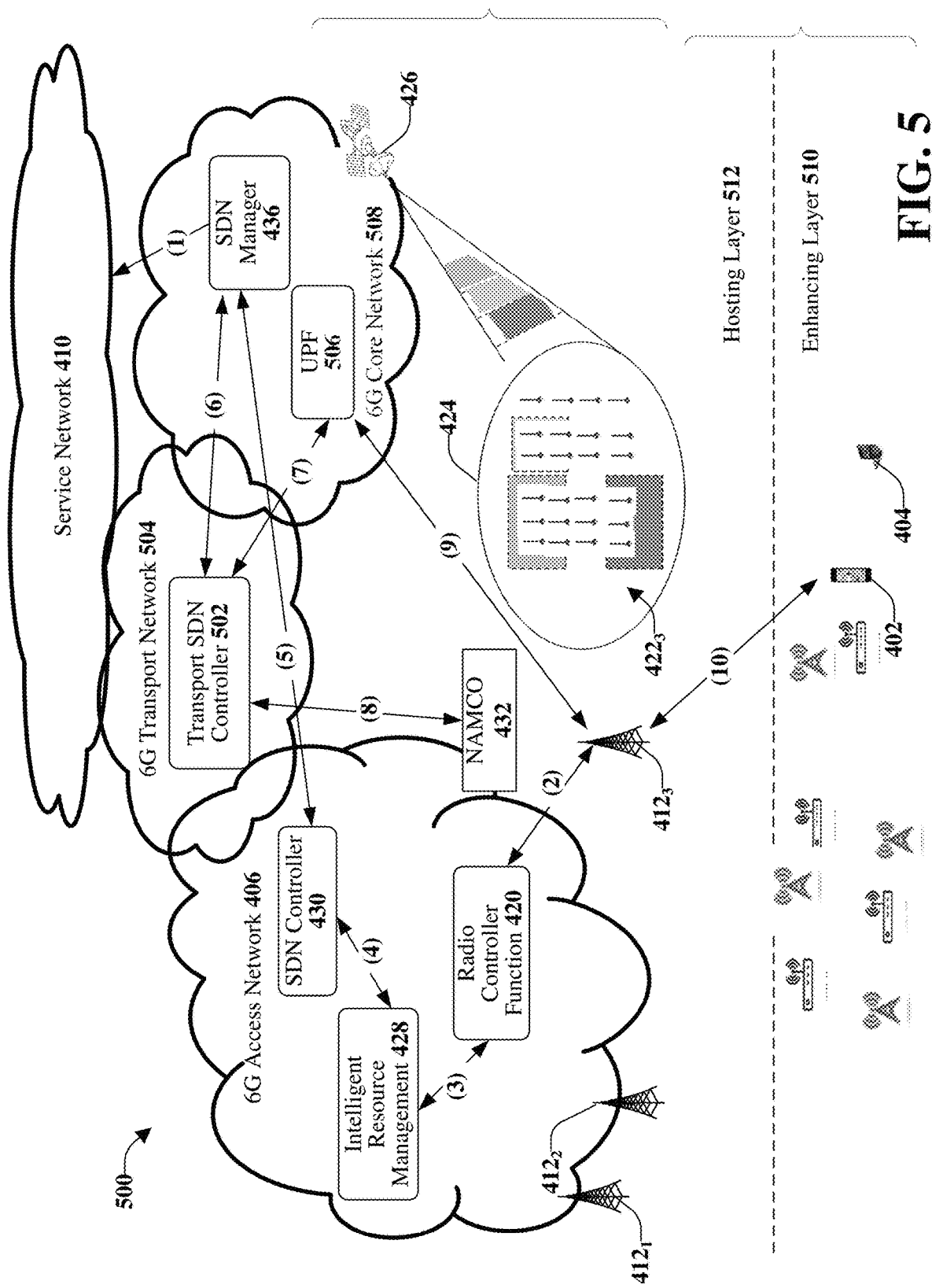
FIG. 5 illustrates an example, non-limiting, system that utilizes a satellite network as backhaul to support a high data-rate in accordance with one or more embodiments described herein.

FIG. 5 illustrates an example, non-limiting, system 500 that utilizes a satellite network as backhaul to support a high data-rate in accordance with one or more embodiments described herein. Repetitive description of like elements employed in other embodiments described herein is omitted for sake of brevity.

When an event is detected or at another time, as indicated at (1), a service layer device can request an SDN manager device 436 to increase backhaul bandwidth to the area associated with the event. In an example, the event can be a planned event such as a musical concert or a sporting event. However, according to some implementations, the event can be an unplanned event (e.g., a spontaneous gathering of people, an emergency situation, and so on). In another example, the other time can be a request to immediately modify a service level agreement associated with a user equipment device. For example, a user of the user equipment device can be watching a sporting event that is being live streamed to the user equipment device. The user might desire a better quality picture, faster streaming, or other features and, therefore, decides to update the service level agreement associated with the user equipment device to derive the better features.

If the event is an unplanned event, radio transmission points (TPs) can report, as indicated at (2) their respective insufficient backhaul link bandwidth and utilization to a Terrestrial Radio Controller Function device (TRCF device 420). The TRCF device 420 can report to an Intelligent Resource Management Function device (e.g., the IRMF device 428) conditions, as indicated at (3). The conditions can include, but are not limited to, backhaul link characteristics and utilizations for all access networks. The IRMF device 428 is an integrated controller across all access technologies, including terrestrial and satellite. According to some implementations, the IRMF device 428 can be, or can be associated with, and SDN controller. Further, the IRMF device 428 can maintain the abstraction of topologies and resources across a 6G access network 406, which can include the backhauls of radio TPs.

As indicated at (4), the IRMF device 428 can synchronize (sync up) with a (RAN) SDN controller device 430. Further, the RAN SDN controller device 430 can indicate to the SDN manager device 436 information related to the backhaul conditions, as indicated at (5). Further, as indicated at (6), the SDN manager device 436 can notify a transport SDN controller 502 of information related to the TP backhaul condition. The transport SDN controller 502 can be included in an 6G Transport Network 504.

Further, as indicated at (7), the transport SDN controller 502 can configure a User Plane Function device (UPF device 506 in a 6G Core Network 508) to forward all traffic or to split part of traffic to the TP via satellite. The determination whether to forward all traffic or to split the traffic can be based on an operator policy related to whether/how to split the traffic between a terrestrial network and a satellite network. For example, the determination can take into account the applications executing on a user equipment device (e.g. a large file downloading) and network slices, to improve the overall system capacity.

As indicated at (8), the transport SDN controller 502 can also instruct the NAMCO device 432 to schedule the satellite network to forward the traffic to the TP. Based on the information, the NAMCO device 432 can schedule the satellite for sending the data to the corresponding TP, as indicated at (9).

The first UE 402 can provide input about its buffered packets (queue), as indicated at (10). The UE buffer status can be further communicated to the SDN controller device 430 for further refinement of the resource allocation.

As illustrated, enhancing layers (e.g., enhancing layer 510) are those layers of the physical radio network of the integrated network that include one or more access devices/small networks (including, but not limited to, femto cells/femto cell access point devices such as femto cell access point devices and Wi-Fi/Wi-Fi access point devices) that facilitate provisioning of more bandwidth locally within close proximity to the mobile device.

Hosting layers (e.g., hosting layer 512) can include one or more access or base station devices (e.g., base station devices, satellite devices)/networks that are more substantial in coverage area (including, but not limited to, cellular communication via cells such as macro cells and satellite communication via satellite communication networks). The enhancing layer 510 and the hosting layer 512 can comprise the physical radio network. The physical radio network can comprise an integrated network.

In one or more embodiments described herein, the integrated network can comprise a terrestrial network (not shown) and a satellite network (not shown) integrated with one or another via a controller (e.g., software-defined networking (SDN) controller) that communicates with both networks and provides intelligent access network selection. One or more terrestrial networks can exist for different types of networks, each terrestrial network controlled by a terrestrial controller. For example, terrestrial controllers, which can be or can control an access point device for a femto cell or for Wi-Fi, for example, while another terrestrial controller (not shown) can be or can control a base station device for a macro cell or millimeter wave network, for example. Satellite controller can control one or more satellite networks in various embodiments. The terrestrial controllers (e.g., the terrestrial controller 132) and/or, in some embodiments, the mobile devices to which they are communicatively coupled) can communicate directly with SDN controller. Satellite controller can communicate directly with the SDN controller.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
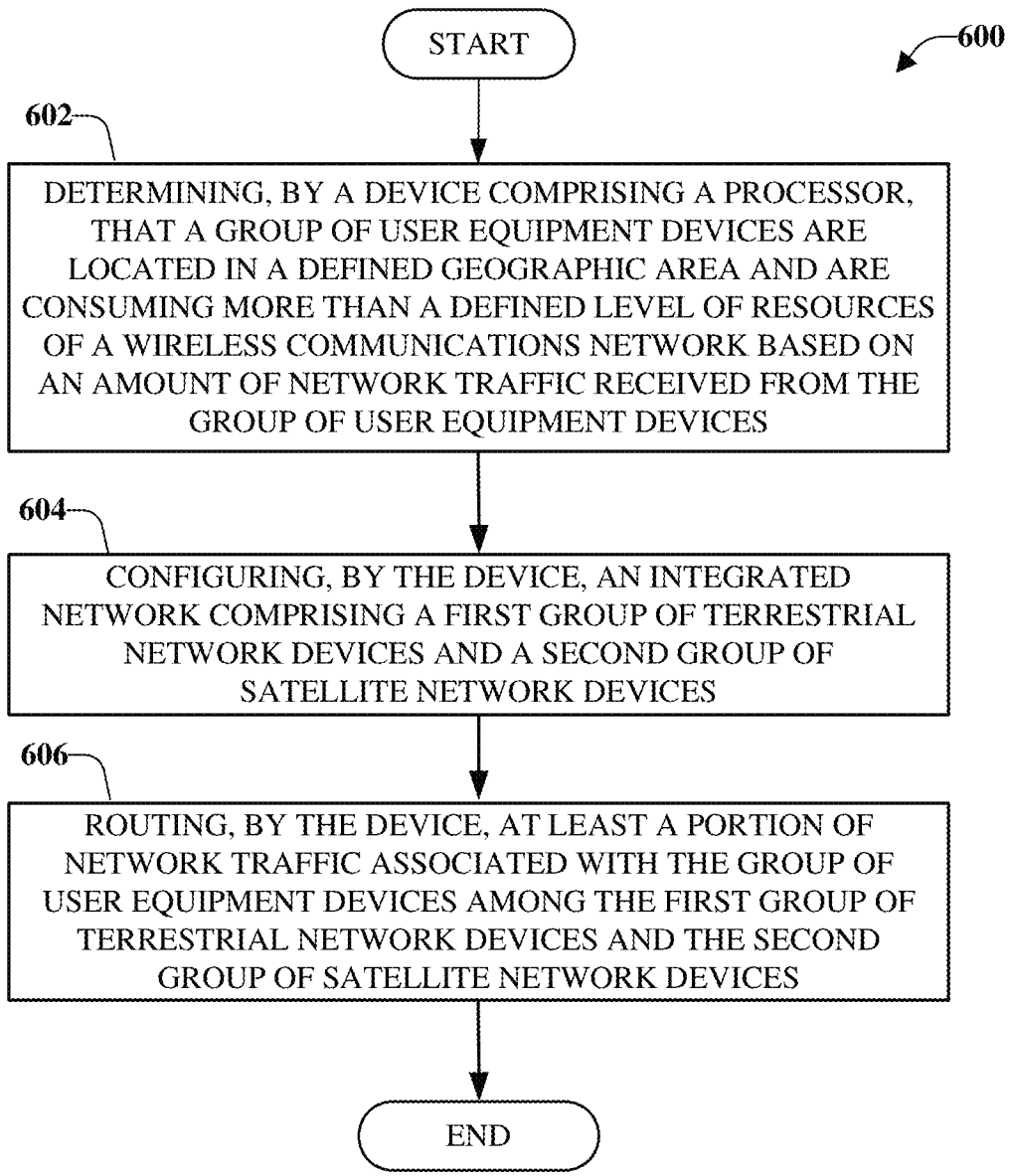
FIG. 6 illustrates a flow diagram of an example, non-limiting, computer-implemented method for facilitating auto dynamic satellite and mobility convergence for mobility backhaul in advanced networks in accordance with one or more embodiments described herein.

FIG. 6 illustrates a flow diagram of an example, non-limiting, computer-implemented method 600 for facilitating auto dynamic satellite and mobility convergence for mobility backhaul in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a device comprising a processor can determine that a group of user equipment devices are located in a defined geographic area and are consuming more than a defined level of resources of a wireless communications network (e.g., via the analysis component 108). The determination can be based on an amount of network traffic received from the group of user equipment devices.

Further, at 604 of the computer-implemented method 600, the device can configure an integrated network comprising a first group of terrestrial network devices and a second group of satellite network devices (e.g., via the assignment component 110). Network traffic (or at least a subset of the network traffic) associated with the group of user equipment devices can be routed among the first group of terrestrial network devices and the second group of satellite network devices, at 606 of the computer-implemented method 600 (e.g., via the assignment component 110). The first group of the network traffic and the second group of the network traffic can be disproportionately split between the first group of terrestrial network devices and the second group of satellite network devices. For example, a first number of network traffic can be routed to the first group of terrestrial network devices and a second number of network traffic can be routed to the second group of satellite network devices. The first number and the second number can be different numbers. However, in some implementations, the first number and the second number can be a same number, or a similar number.

According to some implementations, configuring the network traffic can comprise routing a first group of the network traffic via the first group of terrestrial network devices. Further, configuring the network traffic can comprise routing a second group of the network traffic via the second group of satellite network devices. Further, to these implementations, the computer-implemented method can comprise determining respective applications executing on user equipment devices of the group of user equipment devices. Further, the computer-implemented method can comprise allocating the network traffic of the user equipment devices to the first group of the network traffic or the second group of the network traffic based on the respective applications executing on the user equipment devices.

Further, according to the above implementations, the computer-implemented method can comprise evaluating a service level agreement associated with the respective applications executing on the user equipment devices. In addition, the computer-implemented method can comprise allocating the user equipment devices based on the service level agreement and the respective applications executing on the user equipment devices.

The computer-implemented method can comprise, according to some implementations, controlling a capacity of a radio access based on a convergence of the second group of satellite network devices with the first group of terrestrial network devices.

In some implementations, the computer-implemented method can comprise, prior to determining that the group of user equipment devices are located in the defined geographic area, receiving, from the terrestrial network device, information indicative of respective backhaul link bandwidth and respective resource utilization.

Additionally, or alternatively, the computer-implemented method can comprise, prior to determining that the group of user equipment devices are located in the defined geographic area, determining information related to a planned event. Further, the computer-implemented method can comprise increasing a backhaul bandwidth to the defined geographic area prior to a commencement of the planned event.

In some implementations, the computer-implemented method can comprise scheduling a satellite network device of the second group of satellite network devices to forward the network traffic to a transmission point in the wireless communications network.

Figure 7:
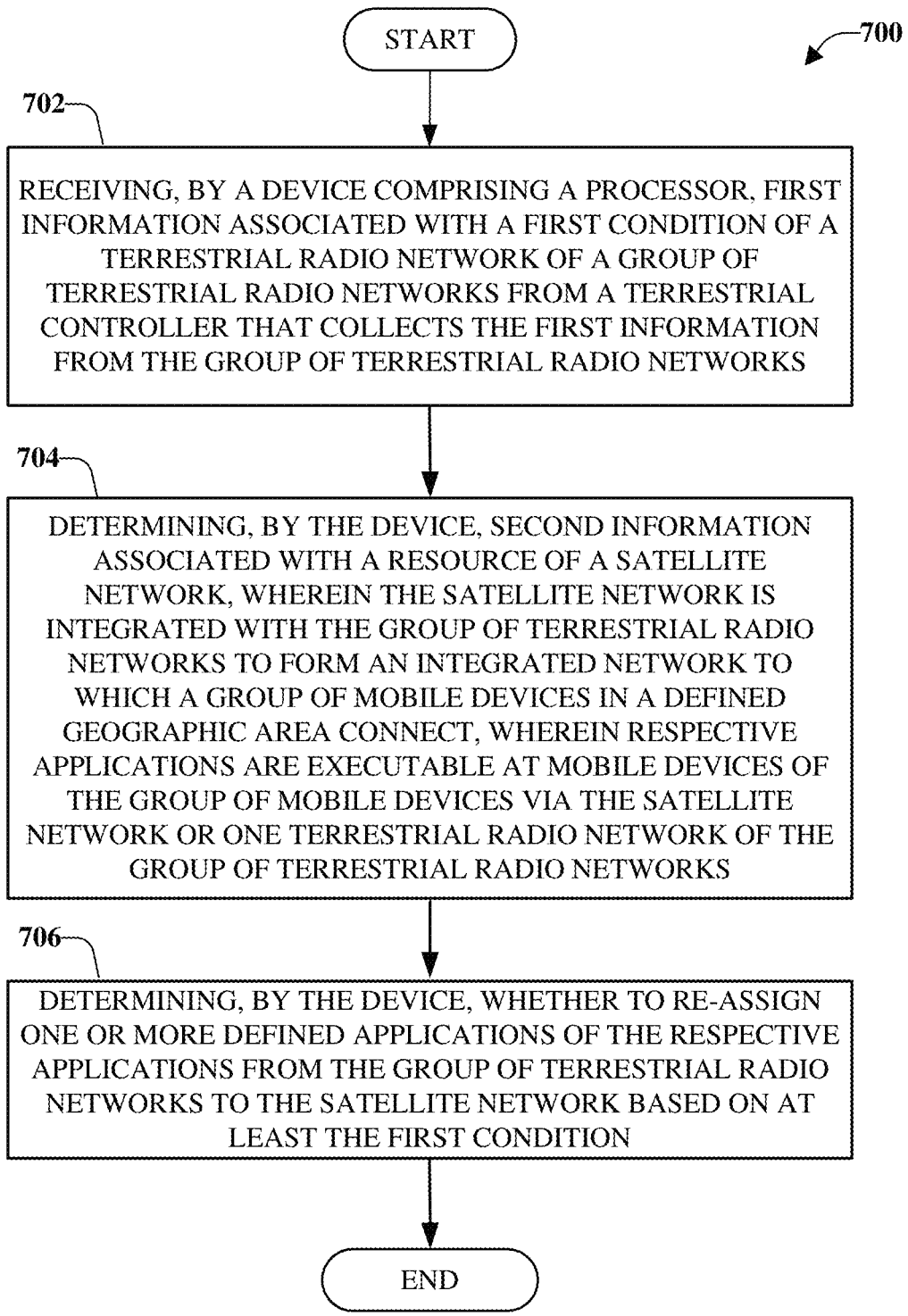
FIG. 7 illustrates a flow diagram of an example, non-limiting, computer-implemented method for using an integrated network for mobility backhaul in advanced networks in accordance with one or more embodiments described herein.

FIG. 7 illustrates a flow diagram of an example, non-limiting, computer-implemented method 700 for using an integrated network for mobility backhaul in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a device comprising a processor can receive first information associated with a first condition of a terrestrial radio network of a group of terrestrial radio networks from a terrestrial controller that collects the first information from the group of terrestrial radio networks (e.g., via the transmitter/receiver component 106).

The device can determine, at 704 of the computer-implemented method 700, second information associated with a resource of a satellite network (e.g., via the analysis component 108). The satellite network can be integrated with the group of terrestrial radio networks to form an integrated network to which a group of mobile devices in a defined geographic area connect. Further, respective applications can be executable at mobile devices of the group of mobile devices via the satellite network or one terrestrial radio network of the group of terrestrial radio networks. In some implementations, the integrated network can be adapted to operate according to a sixth generation wireless telecommunication protocol.

At 706 of the computer-implemented method 700, the device can determine whether to re-assign one or more defined applications of the respective applications from the group of terrestrial radio networks to the satellite network based on at least the first condition (e.g., via the assignment component 110). In an example, the first condition can comprise an access load condition of the terrestrial radio network relative to the resource of the satellite network. Further, the first condition can be based on respective subscriptions associated with the group of mobile devices. According to another example, the first condition can comprise an access load condition of the terrestrial radio network relative to the resource of the satellite network and an acceptable service level of the respective applications.

According to some implementations, a defined application of the one or more defined applications can be alternatively executable at the mobile devices via a selection, by the device, between the satellite network and the group of terrestrial radio networks.

Figure 8:
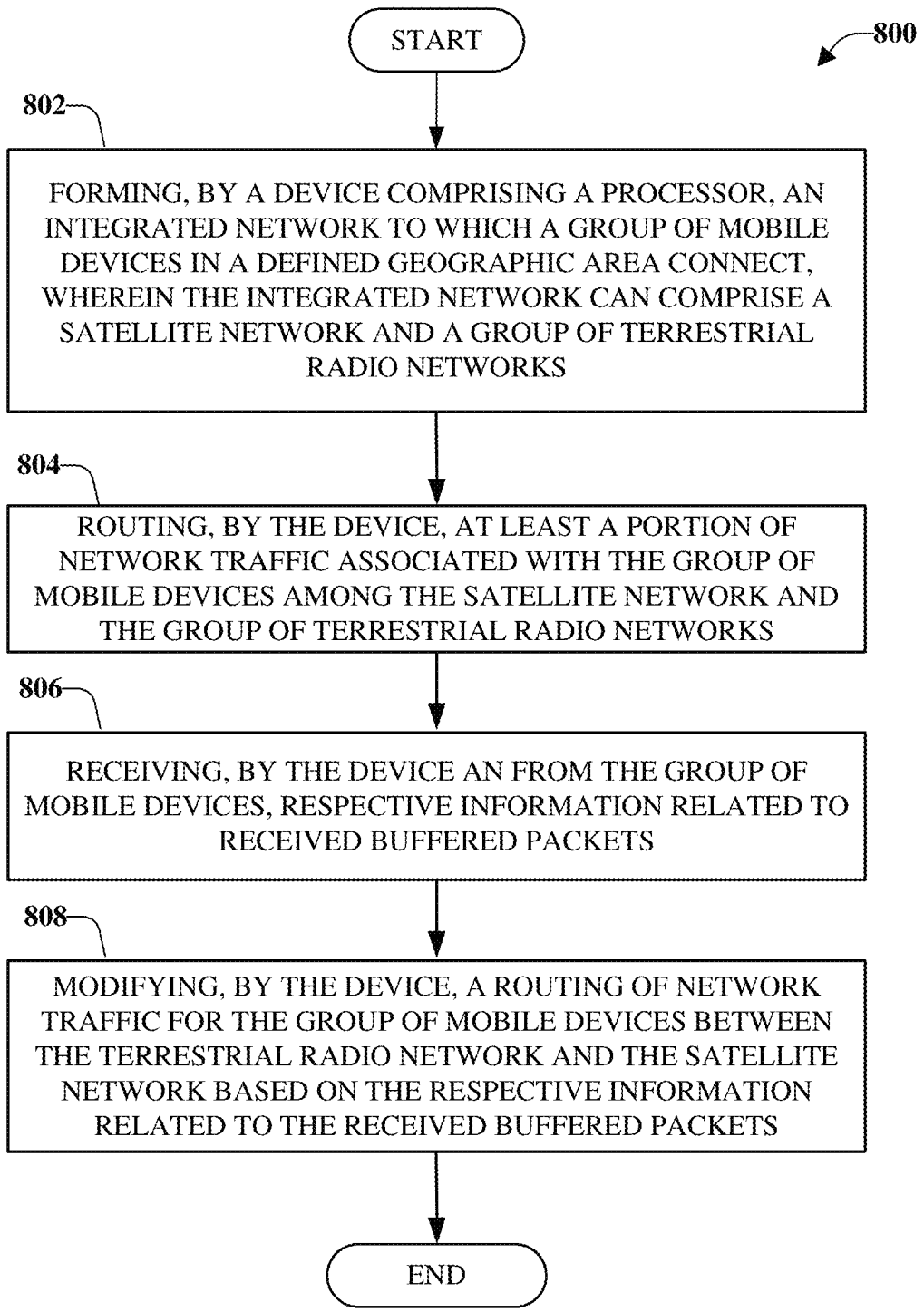
FIG. 8 illustrates a flow diagram of an example, non-limiting, computer-implemented method for modifying a routing of network traffic within an integrated network for mobility backhaul in advanced networks in accordance with one or more embodiments described herein.

FIG. 8 illustrates a flow diagram of an example, non-limiting, computer-implemented method 800 for modifying a routing of network traffic within an integrated network for mobility backhaul in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a device comprising a processor can form an integrated network to which a group of mobile devices in a defined geographic area connect (e.g., via the assignment component 110). The integrated network can comprise a satellite network and a group of terrestrial radio networks. Further, at 804 of the computer-implemented method 800, network traffic (or at least a portion thereof) sent to and/or received from the group of mobile devices can be routed, by the device, among the satellite network and the group of terrestrial radio networks (e.g., via the assignment component 110).

Respective information related to received buffered packets can be received by the device, at 806 of the computer-implemented method 800 (e.g., via the transmitter/receiver component 106). The respective information can be received from mobile devices of the group of mobile devices. Based on the respective information related to the received buffered packets, at 808 of the computer-implemented method 800, the device can modify a routing of network traffic (or at least a portion thereof) sent to and/or received from the group of mobile devices between the terrestrial radio network and the satellite network (e.g., via the adjustment component 112).

Described herein are systems, methods, articles of manufacture, and other embodiments or implementations that can facilitate dynamic satellite and mobility convergence for mobility backhaul in advanced networks with multiple transmission points. Facilitating dynamic satellite and mobility convergence for mobility backhaul in advanced networks with multiple transmission points can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
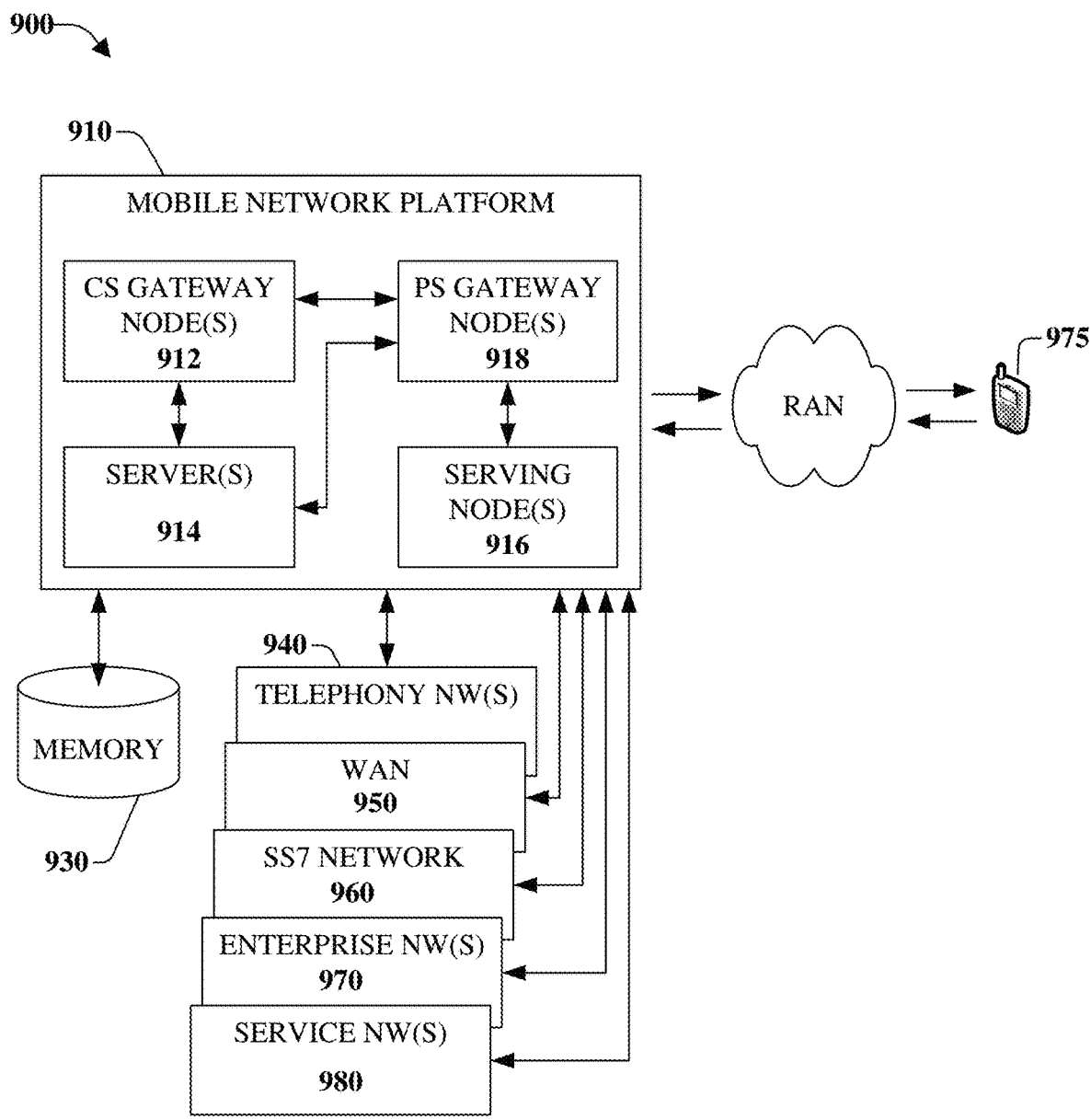
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
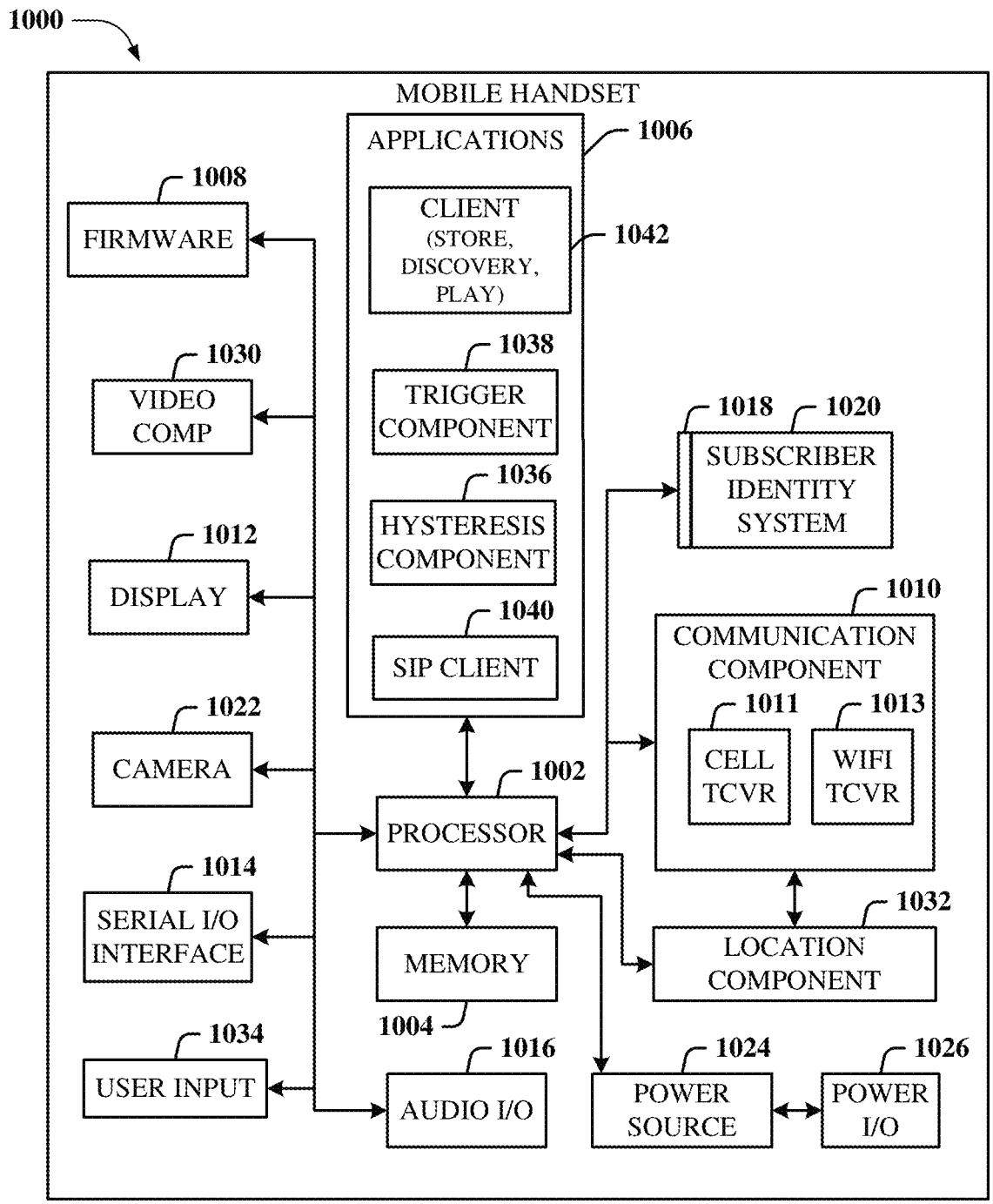
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
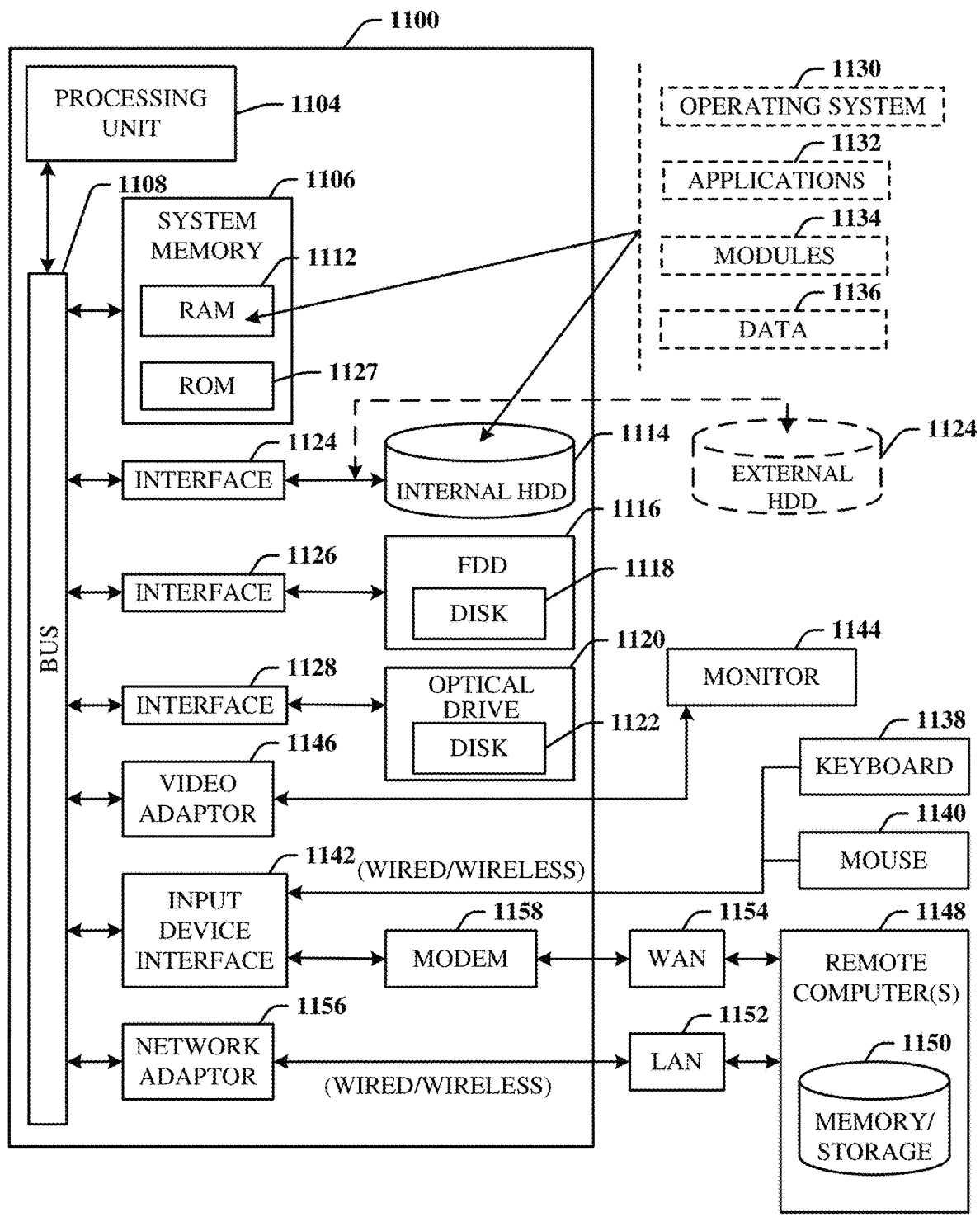
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random-access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16 BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a processor; and
a memory that stores executable instructions that, when executed by the processor, facilitate performance of operations, comprising:
determining that a group of user equipment are located in a defined geographic area and that the group of user equipment are consuming more than a defined level of network resources based on an amount of network traffic received from the group of user equipment and an amount of bandwidth being consumed by respective services executing on the group of user equipment;
configuring an integrated network comprising a first group of terrestrial network equipment and a second group of satellite network equipment based on the group of user equipment consuming more than the defined level of network resources; and
routing at least a portion of network traffic associated with the group of user equipment among the first group of terrestrial network equipment and the second group of satellite network equipment, wherein the routing comprises offloading a first subgroup of user equipment of the group of user equipment from the first group of terrestrial network equipment to the second group of satellite network equipment based on the amount of bandwidth being consumed by the first subgroup of user equipment exceeding a defined bandwidth amount, and wherein a second subgroup of user equipment of the group of user equipment remains connected via the first group of terrestrial network equipment.

2. The device of claim 1, wherein the routing of at least the portion of the network traffic comprises:
routing a first group of network traffic via the first group of terrestrial network equipment; and
routing a second group of network traffic via the second group of satellite network equipment.

3. The device of claim 2, wherein the operations further comprise:
determining respective applications executing on user equipment of the group of user equipment; and
allocating at least the portion of the network traffic of the user equipment to the first group of the network traffic or the second group of the network traffic based on the respective applications executing on the user equipment.

4. The device of claim 3, wherein the operations further comprise:
    evaluating a service level agreement associated with the respective applications executing on the user equipment; and
    allocating the user equipment based on the service level agreement and the respective applications executing on the user equipment.

5. The device of claim 2, wherein the first group of the network traffic and the second group of the network traffic are disproportionately split between the first group of terrestrial network equipment and the second group of satellite network equipment.

6. The device of claim 1, wherein the operations further comprise:
    controlling a capacity of a radio access based on a convergence of the second group of satellite network equipment with the first group of terrestrial network equipment.

7. The device of claim 1, wherein the operations further comprise:
    prior to the determining that the group of user equipment are located in the defined geographic area, receiving, from the terrestrial network equipment, information indicative of respective backhaul link bandwidth and respective resource utilization.

8. The device of claim 1, wherein the operations further comprise:
    prior to the determining that the group of user equipment are located in the defined geographic area, determining information related to a planned event, and
    increasing a backhaul bandwidth to the defined geographic area prior to a commencement of the planned event.

9. The device of claim 1, wherein the operations further comprise:
    scheduling a satellite network equipment of the second group of satellite network equipment to forward at least the portion of the network traffic to a transmission point.

10. The device of claim 1, wherein the operations further comprise:
    receiving, from user equipment of the group of user equipment, respective information related to received buffered packets; and
    adjusting a route for at least the portion of the network traffic for the group of user equipment between the first group of terrestrial network equipment and the second group of satellite network equipment based on the respective information related to the received buffered packets.

11. The device of claim 1, wherein the integrated network is adapted to operate according to a sixth generation wireless telecommunication protocol.

12. A method, comprising:
    receiving, by a device comprising a processor, first information associated with a condition of a terrestrial radio network of a group of terrestrial radio networks from a terrestrial controller that collects the first information from the group of terrestrial radio networks, wherein the condition comprises data that indicates an amount of network resources of the terrestrial radio network being consumed by a group of user equipment exceeds a defined level, wherein the network resources comprise bandwidth available for the group of user equipment, and wherein the bandwidth being consumed by respective services executing on user equipment of the group of user equipment is more than an amount of bandwidth being provided by the group of terrestrial radio networks;
    determining, by the device, second information associated with a resource of a satellite network, wherein the satellite network is integrated with the group of terrestrial radio networks to form an integrated network to which the group of user equipment in a defined geographic area connect, wherein respective applications are executable at user equipment of the group of user equipment via the satellite network or one terrestrial radio network of the group of terrestrial radio networks; and
    determining, by the device, to re-assign at least one first defined application of the respective applications from the group of terrestrial radio networks to the satellite network based on the data that indicates the amount of network resources being consumed exceeds the defined level, wherein at least one second defined application of the respective applications remains assigned to the group of terrestrial radio networks.

13. The method of claim 12, wherein the condition comprises an access load condition of the terrestrial radio network relative to the resource of the satellite network, and is based on respective subscriptions associated with the group of user equipment.

14. The method of claim 12, wherein the condition comprises an access load condition of the terrestrial radio network relative to the resource of the satellite network and an acceptable service level of the respective applications.

15. The method of claim 12, further comprising:
    receiving, by the device from the user equipment, respective information related to received buffered packets; and
    modifying, by the device, a routing of at least a portion of network traffic associated with the group of user equipment between the terrestrial radio network and the satellite network based on the respective information related to the received buffered packets.

16. The method of claim 12, wherein a defined application is alternatively executable at the user equipment via a selection, by the device, between the satellite network and the group of terrestrial radio networks.

17. The method of claim 12, wherein the integrated network is adapted to operate according to a sixth generation wireless telecommunication protocol.

18. A non-transitory machine-readable medium, comprising executable instructions that, when executed by a processor, facilitate performance of operations, comprising:
    obtaining first information associated with a condition of a terrestrial radio network of a group of terrestrial radio networks, wherein the first information comprises an indication that a network bandwidth of the terrestrial radio network being consumed is more than a defined level of network bandwidth;
    obtaining second information associated with a service level agreement associated with a defined application executing on a user equipment device;
    based on the indication that the network bandwidth of the terrestrial radio network being consumed is more than the defined level of network bandwidth and the service level agreement, integrating a satellite network with the group of terrestrial radio networks to form an integrated network to which the user equipment device connects; and
    determining an assignment of the defined application between the terrestrial radio network and the satellite network based on at least the first information and the second information, wherein the determining is based on detection of an event that causes a group of user equipment to be located in a same area, and wherein the assignment comprises retaining first user equipment of the group of user equipment at the terrestrial radio network and transferring second user equipment of the group of user equipment from the terrestrial radio network to the satellite network equipment during the event.

19. The non-transitory machine-readable medium of claim 18, wherein the condition comprises an access load condition of the terrestrial radio network relative to a resource of the satellite network, and is based on at least a subscription of an entity associated with the user equipment device.

20. The non-transitory machine-readable medium of claim 18, wherein the condition comprises an access load condition of the terrestrial radio network relative to a resource of the satellite network and an acceptable service level of the defined application.

\* \* \* \* \*